United States Patent [19]
Erbes

[11] Patent Number: 5,366,331
[45] Date of Patent: Nov. 22, 1994

[54] SHAPE MEMORY LOCK FASTENER

[75] Inventor: John G. Erbes, Mt. View, Calif.

[73] Assignee: General Electric Company, San Jose, Calif.

[21] Appl. No.: 15,990

[22] Filed: Feb. 10, 1993

[51] Int. Cl.⁵ .................. F16B 19/00; F16B 37/08
[52] U.S. Cl. ............................ 411/433; 411/361; 411/909; 411/937.2
[58] Field of Search ............ 411/433, 360, 361, 260, 411/433, 333, 909, 937.2

[56] References Cited

U.S. PATENT DOCUMENTS

| | | | |
|---|---|---|---|
| 3,740,839 | 6/1973 | Otte et al. | 411/909 X |
| 4,022,519 | 5/1977 | Hill | 411/909 X |
| 4,880,343 | 11/1989 | Matsumoto | 411/909 X |
| 4,983,085 | 1/1991 | Gray | 411/361 |
| 5,133,631 | 7/1992 | Beach | 411/909 X |
| 5,160,233 | 11/1992 | McKinnis | 411/433 |

OTHER PUBLICATIONS

Raychem Corp., "Tinel (TM) Shape-Memory Metal," brochure, 3-pages.
Raychem Corp., "CryoFit (TM) High Performance Pipe and Tube Joining System," brochure, 2-pages.

Primary Examiner—Neill R. Wilson
Attorney, Agent, or Firm—J. S. Beulick

[57] ABSTRACT

A lock fastener includes a tubular collar having a plurality of protuberances extending radially inwardly from an inner surface thereof and adapted for cooperating with a bolt to retain the collar thereon. A lock ring surrounds an outer surface of the collar and has an initial inner diameter. The lock ring is formed of shape memory metal alloy effective for shrinking the lock ring to a final inner diameter less than the initial inner diameter upon change in temperature thereof to in turn shrink the collar for clamping the protuberances in locking contact with the bolt.

17 Claims, 3 Drawing Sheets

SHAPE MEMORY LOCK FASTENER

The present invention relates generally to locking fasteners, and, more specifically, to a locking fastener providing effective locking without welding which may be accomplished remotely underwater in a boiling water reactor, for example.

BACKGROUND OF THE INVENTION

In a conventional boiling water nuclear reactor, a pressure vessel contains a reactor core submerged in water. An annular shroud surrounds the reactor core and is spaced radially inwardly from the sidewalls of the pressure vessel to define a relatively narrow downcomer therebetween. Various other components are also found in the pressure vessel and provide considerable congestion therein.

Conventional fasteners in the form of nuts and bolts are used in reactor assemblies, repairs, and modifications, with the nut typically requiring effective locking to the bolt in order to prevent its liberation therefrom. Typically the nuts are lock welded directly to the bolt. Since bolts are typically located underwater in the pressure vessel and with limited available access thereto, maintenance personnel typically must assemble and lock the bolts and nuts remotely, and remotely weld the nuts to the bolts, which is a difficult process.

In one exemplary reactor, a circular plug of material was removed from the core shroud by conventional electrical discharge machining (EDM) for subsequent metallurgical analysis. The remaining aperture in the shroud was plugged using a plug bolt and nut for preventing flow of water through the aperture. In view of the limited access in the vicinity of the aperture in the shroud, an improved fastener design was desired for allowing the bolt and nut to be installed remotely, with the nut being locked to the bolt without the need for conventional welding thereto.

SUMMARY OF THE INVENTION

A lock fastener includes a tubular collar having a plurality of protuberances extending radially inwardly from an inner surface thereof and adapted for cooperating with a bolt to retain the collar thereon. A lock ring surrounds an outer surface of the collar and has an initial inner diameter. The lock ring is formed of shape memory metal alloy effective for shrinking the lock ring to a final inner diameter less than the initial inner diameter upon change in temperature thereof to in turn compress the collar for clamping the protuberances in locking contact with the bolt.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
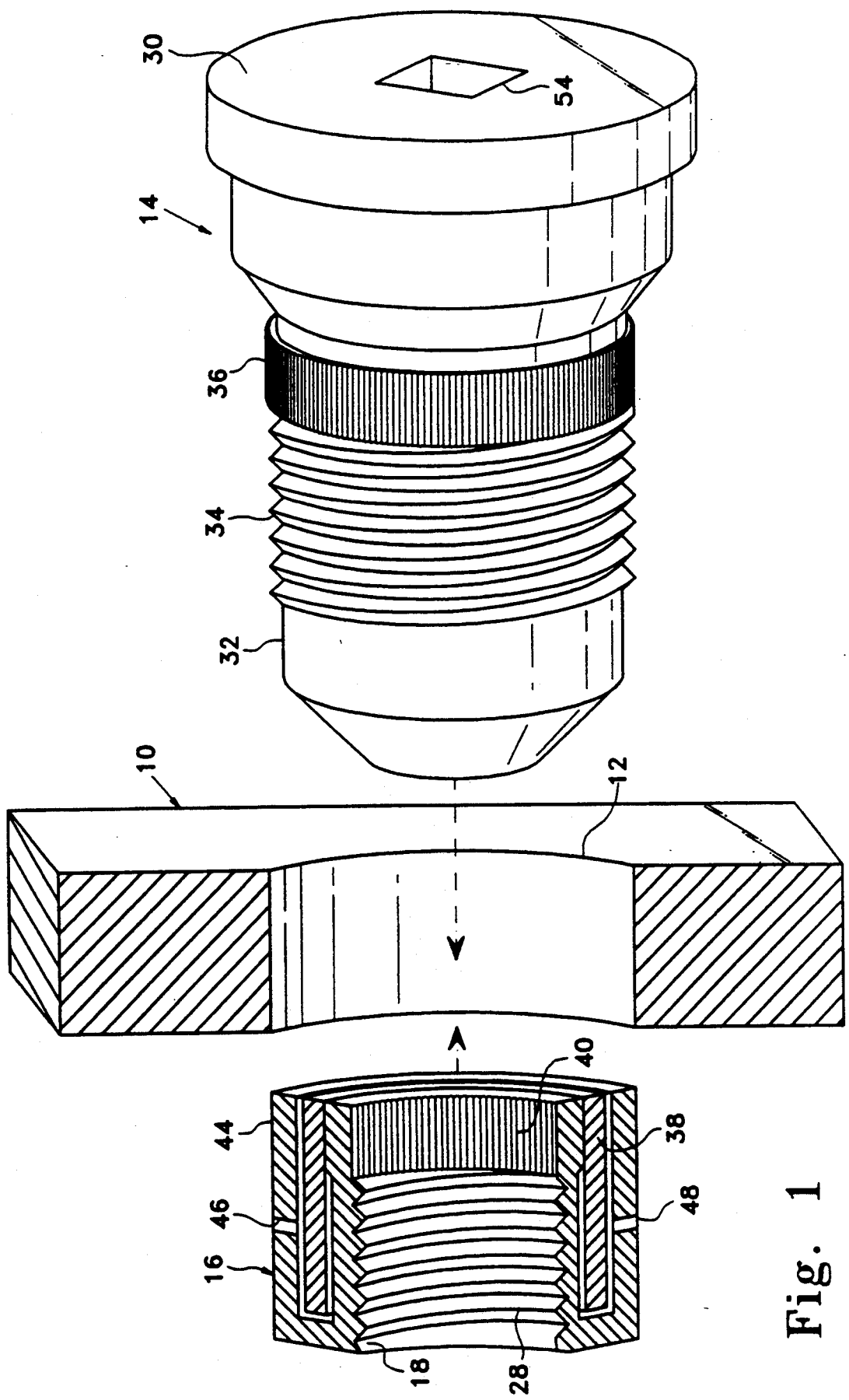
FIG. 1 illustrates schematically and in exploded view a portion of an exemplary annular reactor core shroud having an aperture therein through which is disposed a plug bolt retained therein by a locknut in accordance with one embodiment of the present invention.

Illustrated schematically in FIG. 1 is a portion of a cylindrical core shroud 10 which surrounds a boiling water nuclear reactor core submerged within a pressure vessel (not shown). The shroud includes an aperture 12 therein resulting from the removal of a metallurgical plug sample for subsequent analysis as described above. In order to plug the aperture 12, a cooperating plug bolt 14 and lock fastener or nut 16 in accordance with one embodiment of the present invention are provided for remote assembly thereof underwater through the aperture 12 with the locknut 16 being locked to the bolt 14 without the need for welding thereto.

Figure 2:
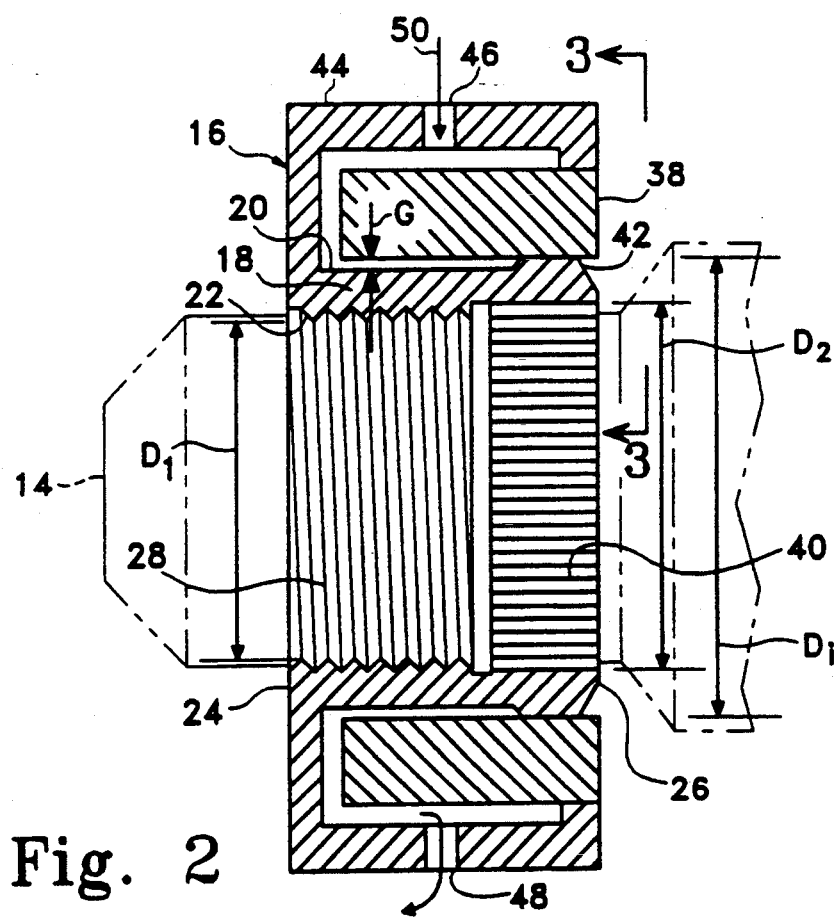
FIG. 2 is an enlarged, sectional view of the locknut illustrated in FIG. 1, and the plug bolt extending therein in phantom.

The locknut 16 is illustrated with more particularity in FIG. 2, assembled to the bolt 14, which is shown in phantom. The locknut 16 includes a tubular collar 18 having radially spaced outer and inner surfaces 20, 22, and first and second axially spaced ends 24, 26. The inner surface 22 includes a plurality of protuberances in the exemplary form of internal screw threads 28 extending radially inwardly therefrom and circumferentially around the collar inner surface 22. The screw threads 28 are conventionally adapted for cooperating with the bolt 14 to retain the collar 18 on the bolt 14, which extends through the collar 18 as illustrated in phantom in FIG. 2, and in exploded view in FIG. 1.

As shown in FIG. 1, each bolt 14 in this exemplary embodiment includes a circular head 30 at one end thereof, and an elongate shank 32 extending from the head 30. The shank 32 includes conventional external screw threads 34 adjacent a distal end thereof, and a plurality of external spline teeth 36 disposed axially between the bolt screw threads 34 and the head 30. The bolt screw threads 34 are complementary in configuration to the collar screw threads 28 for joining the collar 18 to the bolt 14 in conventional threading engagement therewith.

Referring again to FIG. 2, the locknut 16 further includes a 360° continuous, non-split shrinkable lock ring 38 disposed coaxially with the collar 18 and surrounding the collar outer surface 20. In accordance with the present invention, the lock ring 38 is formed of a conventional shape memory metal alloy which is effective for shrinking the lock ring 38 upon change in temperature thereof to in turn compress the collar 18 for clamping the collar 18 in locking contact with the bolt 14 assembled thereto. An example of a shape memory metal alloy is nickel-titanium alloy having a unique transformation temperature at which the crystal structure of the alloy undergoes an austenite-to-martensite phase transformation and corresponding change in shape. A commercially available example of a shape memory metal alloy is identified by the Tinel trademark of Raychem Corporation. When shape memory metal alloy is formed in a ring such as the lock ring 38, heating of the ring to a suitable temperature will effect the phase change thereof causing the lock ring 38 to shrink in diameter. As the lock ring 38 shrinks, it in turn exerts compressive forces on the collar 18 to clamp the collar 18 to the bolt 14.

In a simple embodiment of the locknut 16, the collar 18 and the lock ring 38 may be integrally formed together and both made of the shape memory metal alloy so that upon heating thereof, the lock nut 16 will shrink and clamp the collar threads 28 against the bolt threads 34 for providing effective locking thereto.

Figure 4:
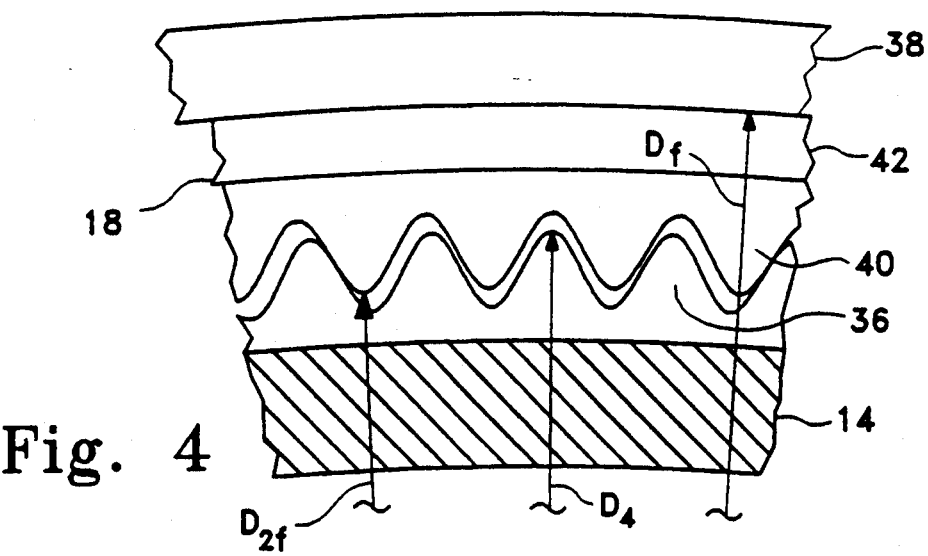
FIG. 4 is a partly sectional end view of a portion of the nut and bolt illustrated in FIG. 3 with cooperating splines thereof being compressed into locking engagement in accordance with the present invention.

However, in the preferred embodiment of the present invention illustrated in the Figures, the lock ring 38 is a separate and distinct part from the collar 18, and the collar 18 includes additional protuberances in the form of a plurality of internal spline teeth 40 as shown in FIG. 2 disposed adjacent the collar second end 26, with the collar screw threads 28 extending around the collar inner surface 22 adjacent the collar first end 24. The lock ring 38 is preferably disposed at least in part around the collar spline teeth 40, and in the embodiment illustrated in FIG. 2 lock ring 38 extends axially also over most of the collar threads 28. In this way, the collar threads 28 may be more easily machined into a collar 18 formed of a conventional, readily machinable material such as stainless steel, and the lock ring 38 itself may be formed of the shape memory metal alloy which is not as readily machinable Furthermore, the collar 18 may be suitably threaded onto the bolt 14 with the respective threads 28, 34 engaging each other so that the locknut 16 may be suitably torqued thereon to preload the bolt 14 as required to keep the bolted assembly tight during operation. And then, upon suitable heating of the lock ring 38, it will compress to in turn shrink the collar second end 26 with the collar spline teeth 40 thereon into locking or clamping contact with the complementary bolt spline teeth 36 as shown in FIG. 4.

Figure 3:
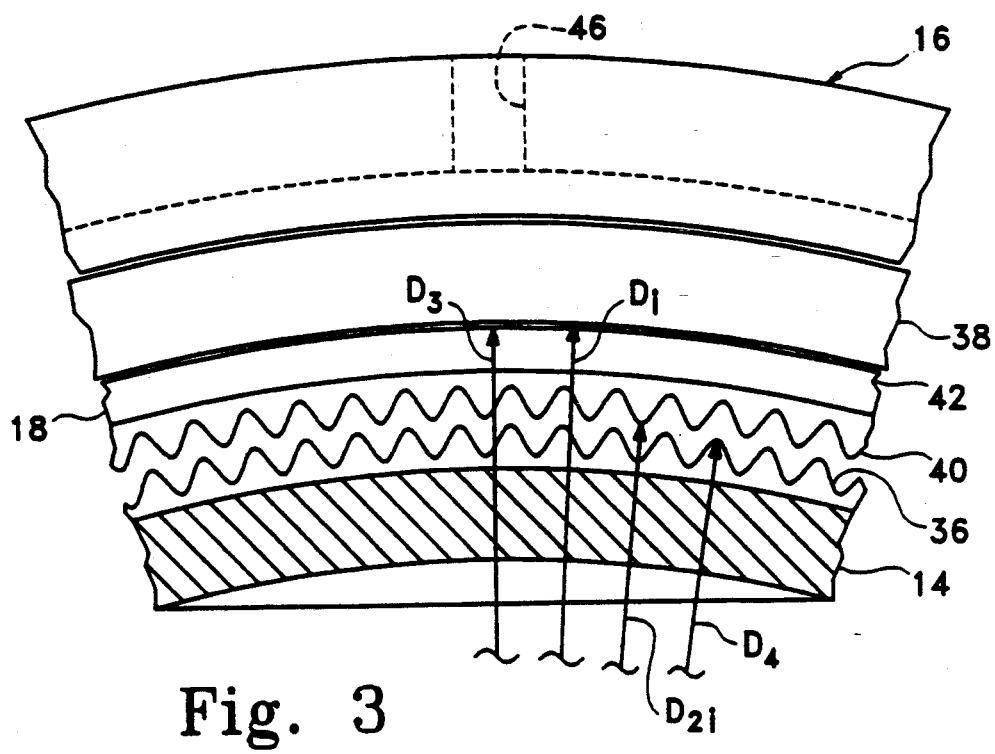
FIG. 3 is a partly sectional view of a portion of the locknut and bolt extending therethrough as shown in FIG. 2 and taken along line 3—3.

More specifically, and referring again to FIG. 2, the collar threads 28 have an inner first diameter $D_1$, and the collar spline teeth 40 have an inner second diameter $D_2$ which is greater than the first diameter $D_1$ to allow the cooperating collar threads 28 to engage the bolt threads 34 without obstruction between the collar and bolt spline teeth 40, 36 during assembly. As illustrated in FIGS. 2 and 3, the initial, undeformed shape of the lock ring 38 has an initial inner diameter $D_i$, and upon suitable heating of the lock ring 38 it shrinks to a final inner diameter $D_f$, as illustrated in FIG. 4, which is less than the initial diameter $D_i$.

In the preferred embodiment illustrated in FIGS. 2 and 3, the collar outer surface 20 preferably also includes an elevated or larger diameter, integral annular land 42 having an outer third diameter $D_3$ (see FIG. 3) which is suitably less than the initial inner diameter $D_i$ of the lock ring 38, with the land 42 being disposed around the collar spline teeth 40, with the lock ring 38 being disposed in contact with the land 42. During preassembly, the lock ring 38 may be positioned over the land 42 and suitably heated for providing a slight interference fit against the land 42 to prevent the liberation of the lock nut 38 therefrom. A radial gap G will then remain between the inner surface of the lock ring 38 and the collar outer surface 20 axially away from the land 42 so that the compressive forces exerted by the lock ring 38 are concentrated on the land 42 to reduce the diameter of the land 42 and in turn clamp the collar spline teeth 40 in locking contact with the bolt spline teeth 36.

As illustrated in FIG. 3, the bolt spline teeth 36 are complementary in configuration to the collar spline teeth 40 and have an outer fourth diameter $D_4$. Prior to shrinkage of the lock nut 38, the inner second diameter $D_2$ of the collar spline teeth 40 has an initial value $D_{2i}$ as illustrated in FIG. 3 which is greater than the outer fourth diameter $D_4$ of the bolt spline teeth 36 for allowing the collar screw threads 28 to engage the bolt screw threads 34 without obstruction between the collar and bolt spline teeth 40, 36 during assembly. The radial gap between the collar and bolt spline teeth 40, 36 as illustrated in FIG. 3 allows rotation of the locknut 16 without restraint by the bolt spline teeth 36.

However, upon heating of the lock ring 38 to its phase transformation temperature, the lock ring 38 will shrink in diameter and in turn cause the diameter of the collar 18 at the land 42 to be reduced either elastically, or preferably plastically for engaging together the collar and bolt spline teeth 40, 36 as illustrated in FIG. 4 to lock the collar 18 to the bolt 14. As shown in FIG. 4, after the phase transformation of the lock ring 38, the inner second diameter $D_2$ of the collar spline teeth 40 has a final value $D_{2f}$ which is less than the outer fourth diameter $D_4$ of the bolt spline teeth 36. In this way, the collar and bolt spline teeth 40, 36 engage each other for preventing circumferential movement therebetween and thereby prevent rotation of the collar 18 during operation in the nuclear reactor.

Accordingly, the locknut 16 may be suitably torqued to the bolt 14 during assembly, and then the lock ring 38 is heated and undergoes phase transformation, causing it to shrink against the collar land 42, with the compressive forces being concentrated against the land 42 to compressively plastically yield the collar 18 at its second end 26 containing the spline teeth 40. Of course, the lock ring 38 will also provide some compressive forces around the collar threads 28 for additionally clamping the collar threads 28 to the bolt threads 34.

Since the land 42 and the collar spline teeth 40 thereat are preferably permanently plastically deformed into engagement with the bolt spline teeth 36 as illustrated in FIG. 4, the lock ring 38 is no longer required for maintaining locking of the locknut 16 to the bolt 14. In this way, the locknut 16 is permanently locked to the bolt 14 without the need for welding thereto, and the lock ring 38 is no longer required.

Since the lock ring 38 is formed of the shape memory metal alloy, its long-term integrity is not yet fully established in the high neutron flux environment of the boiling water reactor and, therefore, the locknut 16 preferably also includes a generally L-shaped annular skirt 44, as shown in FIG. 2 for example, which is integrally joined to the collar 18 and surrounds the lock ring 38 both radially outwardly thereof and on at least one axial side thereof for loosely capturing or retaining the lock ring 38 to the collar 18. In this way, when the locknut 16 is finally assembled to the bolt 14, the open end of the skirt 44 is disposed in sealing contact against the sidewall of the shroud 10 (see FIG. 1) to prevent liberation of any portion of the lock ring 38 in the event that it fails and fragments in the high-neutron flux environment. As mentioned above, failure of the lock nut 38 does not compromise the locking ability of the locknut 16 since the land 42 has already been plastically deformed to engage the cooperating spline teeth 40 and 36.

As shown in FIG. 1, the collar and bolt spline teeth 40, 36 preferably extend axially in this exemplary embodiment, with adjacent ones thereof being spaced apart circumferentially. In alternate embodiments, the spline teeth 40, 36 could also extend circumferentially with adjacent ones thereof being spaced apart axially.

Although the total number of collar spline teeth 40 may be equal to the total number of the bolt spline teeth 36 with both having substantially identical and complementary configurations, in the preferred embodiment illustrated in FIG. 4, the collar and bolt spline teeth 40, 36 differ in total number by one, although a difference of more than one may also be used. This will ensure that a significant number of the cooperating spline teeth will always engage upon shrinkage of the lock ring 38, regardless of the relative rotational positions of the locknut 16 and the bolt 14. This also prevents the possibility of the crests of all of the collar spline teeth 40 being aligned in direct opposition to the crests of the bolt spline teeth 36 which might prevent engagement thereof upon shrinking of the lock ring 38. In one exemplary embodiment, the number of collar spline teeth 40 may be 180, and the number of bolt spline teeth 36 may be 181.

Referring again to FIG. 2, since the skirt 44 substantially surrounds the lock ring 38, it preferably includes circumferentially spaced, for example at 180°, inlet and outlet holes 46, 48 for channeling a heated fluid such as steam 50 through the skirt 44 and in contact with the lock ring 38 for heating the lock ring 38 and thereby shrinking the lock ring 38. For example, with a lock ring 38 formed of the Tinel brand alloy mentioned above, heating of the lock ring 38 to about 93° C. is all that is required for shrinking the lock ring 38 to engage the cooperating spline teeth 36, 40. While this shrinking and locking can occur automatically as the reactor reaches normal operating temperature, heating during installation allows confirmation of locking by application of a loosening torque prior to operation.

Figure 5:
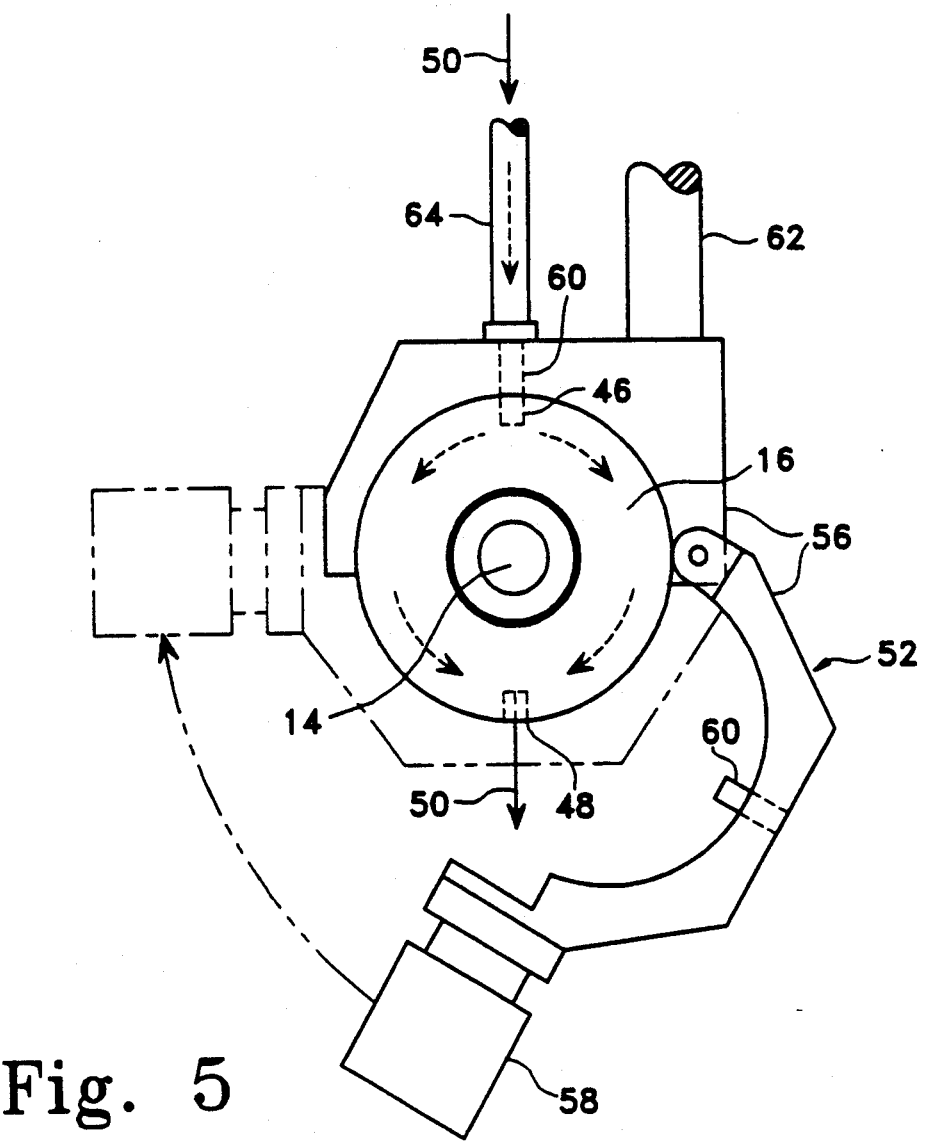
FIG. 5 is a schematic, end view of the assembled locknut and bolt illustrated in FIG. 1 showing an assembly tool for torquing the nut to the bolt as well as heating the nut with steam.

In the exemplary embodiment illustrated in FIG. 1, the bolt head 30 and the outer circumference of the locknut 16, i.e. the skirt 44, are circular cylindrical although they could have conventional non-circular forms for being conventionally torqued together by a conventional tool. For example, they may be hexagonal. Since in the preferred embodiment illustrated in FIG. 1 they are circular cylindrical, a suitable tool 52 as shown in FIG. 5 is provided for cooperating with the inlet and outlet holes 46, 48 of the lock nut 16. A conventional square drive wrench (not shown) is used to hold, install, and rotate the bolt 14 by cooperating with a square hole 54 in the bolt head 30 as shown in FIG. 1. The tool 52 illustrated in FIG. 5 includes a pair of C-shaped halves 56 hinged together at one end and selectively fixedly joined together at an opposite end by a conventional air cylinder 58 having an output rod suitably locking together the two halves 56. Each of the two halves includes a tubular pipe 60 fixedly joined thereto and which may be selectively inserted into the respective inlet and outlet holes 46, 48 when the two halves 56 are joined together. An elongate handle 62 is joined to one of the tool halves 56 to prevent rotation of the tool 52 and the locknut 16 during torquing of the bolt 14 into the locknut 16. The top pipe 60 illustrated in FIG. 5 is conventionally joined to a steam supply line 64 for channeling the steam 50 through the top half of the tool 52 and into the inlet hole 46 for flow around the lock ring 38 therein for heating the lock ring 38 and causing the phase transformation thereof. The steam 50 is discharged from the outlet hole 48 and through the bottom pipe 60.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention. For example, although protuberances in the form of the screw threads 28 and spline teeth 40 have been disclosed for the collar 18, the protuberances could also be conventional knurls if desired.

Accordingly, what is desired to be secured by Letters Patent of the United States is the invention as defined and differentiated in the following claims:

1. A lock fastener adapted for cooperating with a bolt, comprising:
    a tubular collar having radially outer and inner surfaces and first and second spaced ends, said inner surface having a plurality of protuberances extending radially inwardly therefrom and adapted for cooperating with said bolt to retain said collar on said bolt; and
    a lock ring surrounding said collar outer surface and having an initial inner diameter, said lock ring being formed of a shape memory metal alloy effective for shrinking said lock ring to a final inner diameter less than said initial inner diameter in response to a change in the temperature thereof to in turn compress said collar for clamping said protuberances in contact with said bolt, wherein said collar protuberances comprise screw threads extending around said collar inner surface.

2. A lock fastener adapted for cooperating with a bolt, comprising:
    a tubular collar having radially outer and inner surfaces and first and second spaced ends, said inner surface having a plurality of protuberances extending radially inwardly therefrom and adapted for cooperating with said bolt to retain said collar on said bolt; and
    a lock ring surrounding said collar outer surface and having an initial inner diameter, said lock ring being formed of a shape memory metal alloy effective for shrinking said lock ring to a final inner diameter less than said initial inner diameter in response to a change in the temperature thereof to in turn compress said collar for clamping said protuberances in contact with said bolt, wherein said collar protuberances comprise spline teeth.

3. A fastener according to claim 2 further comprising screw threads extending around said collar inner surface adjacent said collar first end; and wherein said collar spline teeth are disposed adjacent said collar second end, and said lock ring is disposed at least in part around said collar spline teeth.

4. A fastener according to claim 3 wherein said collar screw threads have an inner first diameter, and said collar spline teeth have an inner second diameter being greater than said first diameter.

5. A fastener according to claim 4 wherein:
    said collar outer surface includes an elevated annular land having an outer third diameter less than said lock ring initial inner diameter and disposed around said collar spline teeth; and
    said lock ring is disposed in contact with said land.

6. A fastener according to claim 5 in combination with said bolt, said bolt comprising:
    a head at one end thereof; and a shank extending from said head, said shank including screw threads adjacent a distal end thereof, and spline teeth disposed axially between said bolt screw threads and said head, said bolt screw threads being complementary to said collar screw threads for joining said collar to said bolt in threading engagement therewith, and said bolt spline teeth being complementary to said collar spline teeth and having an outer fourth diameter, said second diameter having an initial value greater than said fourth diameter for allowing said collar screw threads to engage said bolt screw threads without obstruction between said collar and bolt spline teeth, and having a final value less than said fourth diameter after shrinking of said lock ring for engaging together said collar and bolt spline teeth to lock said collar to said bolt.

7. An apparatus according to claim 6 wherein said collar and bolt spline teeth extend axially, with adjacent ones thereof being spaced apart circumferentially.

8. An apparatus according to claim 7 wherein said collar and bolt spline teeth differ in total number by one.

9. An apparatus according to claim 7 further comprising an annular skirt being integrally joined to said collar and surrounding said lock ring both radially outwardly thereof and on at least one axial side thereof for capturing said lock ring to said collar.

10. An apparatus according to claim 9 wherein said skirt includes circumferentially spaced inlet and outlet holes for channeling a heated fluid through said skirt and in contact with for heating said lock ring and thereby shrinking said lock ring.

11. A lock nut comprising:
a generally circular cylindrical lock ring made of shape memory metal alloy and having an inner circumferential surface with a diameter that decreases from an initial value to a final value in response to a change in temperature from an initial temperature to a final temperature; and
a generally circular cylindrical body having a first portion with an outer circumferential surface in contact with said inner circumferential surface of said lock ring at said initial temperature and having an inner circumferential surface occupied by an alternating pattern of crests and troughs,
wherein said generally circular cylindrical body is compressed by said lock ring to displace said alternating pattern of crests and troughs radially inward in response to the said decrease in diameter of said lock ring.

12. The lock nut as defined in claim 11, wherein said peaks and troughs extend in parallel with a centerline axis of said lock nut.

13. The lock nut as defined in claim 11, wherein said circular cylindrical body further comprises a second portion having screw threads on an inner circumferential surface.

14. The lock nut as defined in claim 13, wherein said second portion of said circular cylindrical body has an outer circumferential surface which is separated from said lock ring by a first circular cylindrical gap.

15. The lock nut as defined in claim 14, further comprising first means for forming a second circular cylindrical gap adjacent an outer circumferential surface of said lock ring, and second means for forming an annular gap adjacent an end face of said lock ring, wherein said first circular cylindrical gap communicates with said second circular cylindrical gap via said annular gap to form a flowpath for fluid.

16. The lock nut as defined in claim 15, wherein said first and second means are integrally connected, and said second means and said generally circular cylindrical body are integrally connected.

17. The lock nut as defined in claim 15, further comprising inlet means and outlet means in flow communication with said fluid flowpath.

* * * * *